(12) United States Patent
Farah et al.

(10) Patent No.: US 6,950,860 B1
(45) Date of Patent: Sep. 27, 2005

(54) METHOD AND SYSTEM FOR INTEGRATING BUILDING SERVICES BY DEVELOPING AND LOADING AN ADAPTER ELEMENT FOR EACH OF THE DEVICES AND APPLICATIONS OF PLURALITY OF INTEGRATED BUILDING SERVICES TO ENCAPSULATE THE PLURALITY OF INTEGRATED BUILDING SERVICES WITH A STANDARD INTERCONNECTION BEHAVIOR

(75) Inventors: Barry Scott Farah, Colorado Springs, CO (US); Randall Scott Welsch, Colorado Springs, CO (US); Paul Mike Canaday, Colorado Springs, CO (US); Albert William Butkus, Colorado Springs, CO (US); Craig William Vollenweider, Parker, CO (US)

(73) Assignee: Master Solutions, Inc., Colorado Springs, CO (US)

( * ) Notice: Subject to any disclaimer, the term of this patent is extended or adjusted under 35 U.S.C. 154(b) by 670 days.

(21) Appl. No.: 09/603,314

(22) Filed: Jun. 24, 2000

Related U.S. Application Data

(60) Provisional application No. 60/142,321, filed on Jul. 2, 1999.

(51) Int. Cl.[7] .................. G06F 15/16; G06F 15/173; G06F 15/177
(52) U.S. Cl. .................. 709/218; 709/203; 709/220; 709/222; 709/223; 709/227
(58) Field of Search .................. 709/223, 203, 709/220–222, 218, 219; 700/1, 83; 713/182, 713/701; 717/174, 104, 310; 707/200; 340/533; 704/217; 703/27

(56) References Cited

U.S. PATENT DOCUMENTS

| | | | | |
|---|---|---|---|---|
| 5,517,185 A | * | 5/1996 | Acimovic et al. | 340/5.33 |
| 5,535,375 A | * | 7/1996 | Eshel et al. | 703/27 |
| 6,041,362 A | * | 3/2000 | Mears et al. | 719/310 |
| 6,167,564 A | * | 12/2000 | Fontana et al. | 717/104 |
| 6,233,588 B1 | * | 5/2001 | Marchoili et al. | 707/200 |
| 6,349,408 B1 | * | 2/2002 | Smith | 717/174 |
| 6,446,109 B2 | * | 9/2002 | Gupta | 709/203 |
| 6,498,955 B1 | * | 12/2002 | McCarthy et al. | 700/1 |
| 6,557,033 B2 | * | 4/2003 | Maeda | 709/223 |
| 6,581,161 B1 | * | 6/2003 | Byford | 713/182 |
| 6,631,406 B1 | * | 10/2003 | Pantages et al. | 709/223 |

* cited by examiner

Primary Examiner—Rupal Dharia
Assistant Examiner—Quang N. Nguyen
(74) Attorney, Agent, or Firm—Gibson, Dunn & Crutcher LLP; Stanley J. Gradisar

(57) ABSTRACT

A national or international plurality of interacting, media-connected buildings, providing automated office support processes to individual and aggregate office user customers. Process services are coordinated between building elements via the inter-networking feature that uses the facilities of the public Internet. These distributed services are adaptable and personalized to meet the changing needs of individual office users. Service personalization is continuously maintained in a consistent state throughout the entire global network of buildings, providing individual office users with identical service personalization in all office buildings.

17 Claims, 9 Drawing Sheets

METHOD AND SYSTEM FOR INTEGRATING BUILDING SERVICES BY DEVELOPING AND LOADING AN ADAPTER ELEMENT FOR EACH OF THE DEVICES AND APPLICATIONS OF PLURALITY OF INTEGRATED BUILDING SERVICES TO ENCAPSULATE THE PLURALITY OF INTEGRATED BUILDING SERVICES WITH A STANDARD INTERCONNECTION BEHAVIOR

CROSS REFERENCE TO RELATED APPLICATION

This application claims the benefit of U.S. Provisional Application No. 60/142,321, filed on Jul. 2, 1999.

FIELD OF THE INVENTION

This invention relates to computers and communication systems. More particularly, the present invention relates to system adaptation, embedded systems, device and service interconnection, computers, software systems, and communication networks for a method and system of integrated building services.

BACKGROUND OF THE INVENTION

Many computer systems have been integrated into the modern business office with the goal if increasing efficiency. However, in many instances, the goal of increased efficiency was not met because the mundane tasks subject to office automation were simply transferred from paper to the computer systems, and in many cases, the cognitive load placed on the office worker actually increased. There is a need in the art to better integrate office automation with the office environment itself to realize the increased efficiency desired.

SUMMARY OF THE INVENTION

It is an aspect of the present invention to provide personalized elimination of mundane office processes and services for office users across geographically distributed Building Elements.

Yet another aspect of the invention is to provide a single integrated building containing office support services such as secure building, office suite, and other building resource access.

Still another aspect of the invention is to provide an inter-networked integrated building facility, device and service interconnection network interface, architecture of integrated office service facilities, and device adapter modules.

DETAILED DESCRIPTION OF THE INVENTION

Figure 1:
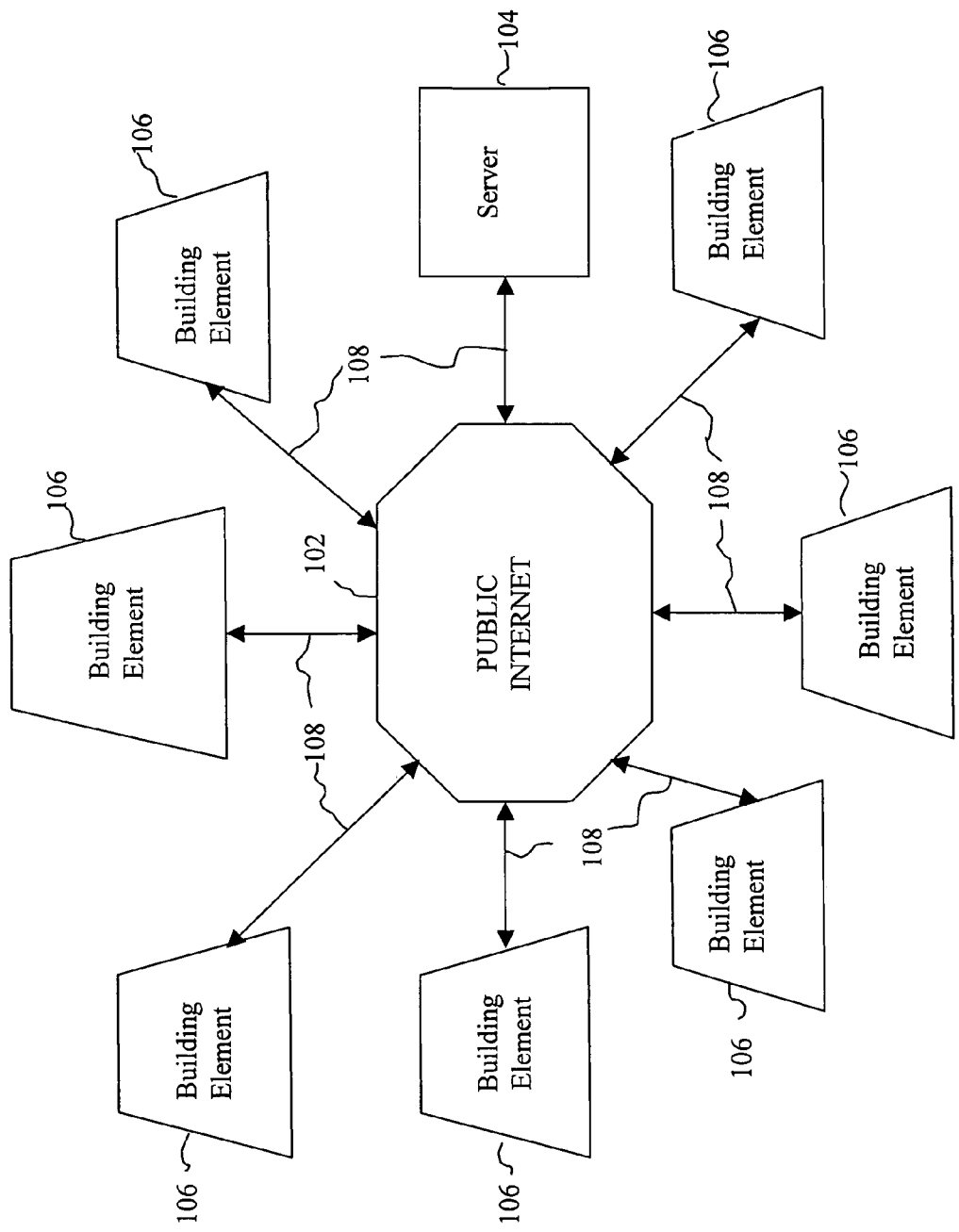
FIG. 1 shows a block diagram of a high-level view of the global context of the present invention.

FIG. 1 shows a block diagram of a high-level view of the global context of the present invention. Referring now to FIG. 1, a limiting factor in small and medium-sized business success is the loss of productivity in the office place caused by the large fraction of each workday spent dealing with mundane tasks. Activities such as scheduling, ordering, copying, tasking, filing, etc., irretrievably consume time that could have been used for human productive creativity—the real value in today's business world.

Because of the need to increase efficiency, computer systems experienced rapid uptake in the business office. However, looking at the creative efficiency picture today, the expected gains in terms of real additional time available for creative work are realized only to a small degree. This plateau was quickly reached because the office support automation revolution simply transferred the mundane activities from paper to the computer. In many cases, efficiency is decreased due to the increased cognitive load placed on the office worker by arcane, poorly integrated technology. For large organizations, with several buildings in a cluster, or multiple building locations throughout a city or across several states, this is even more the case.

The next level of creative efficiency is achieved by the present invention which integrates and merges office automation technology with the office environment itself in such a transparent way that the machinery is no longer even visible to the office worker. The mundane tasks are accomplished by the building itself. The novel approach taken looks at the problem from the point of view of the user inward, and not from the traditional approach of a back-end view of the system outward. The architecture utilized works from the outside in, from a user prospective, and then performs integration on the back end versus the other way around.

Accordingly, the present invention is a system and method that provides personalized elimination of mundane office processes and services for office users across geographically distributed Building Elements 106. Building Elements 106 may be located adjacent to each other, across town from each other, in different cities, in different states, or in different countries. Utilizing the Public Internet 102, or any other suitable communications network, and Communications Channels 108, each Building Element 106 is interconnected to each other Building Elements 106. Communications Channels 108 may be wire, fiber optic, wireless, or any other suitable communications channel. Examples include DSL, T1, T2, T3, etc.

Server 104 is accessed by each Building Element 106 and may be located in a physical location separate from any Building Element 106, or may be located within a Building Element 106. There may also be multiple Servers 104 located in separate physical locations or within several Building Elements 106. An individual Building Element 106 with a Server 104 may also utilize the present invention.

Figure 2:
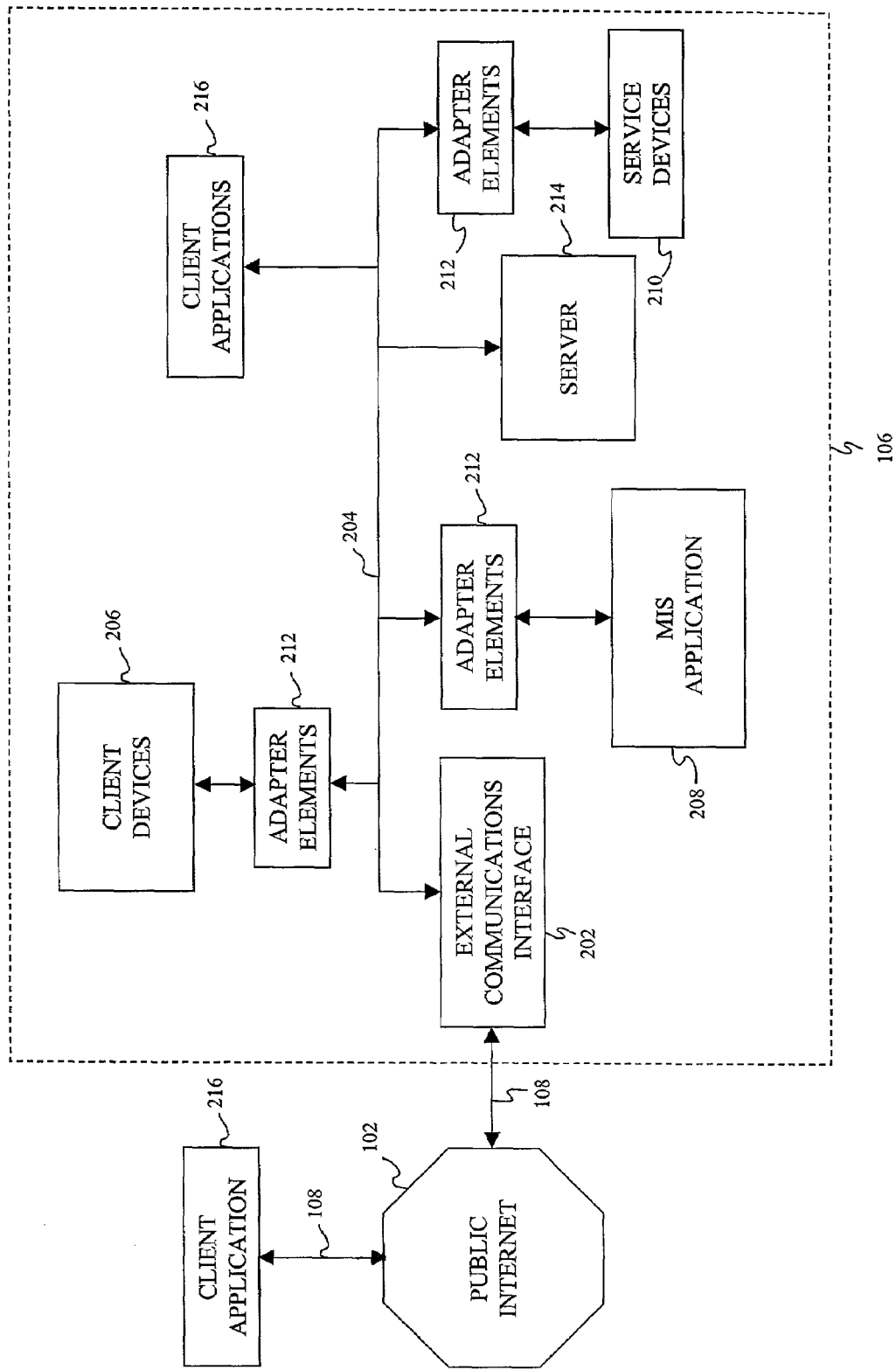
FIG. 2 shows a block diagram of the major components comprising the integrated building services in an embodiment of the present invention.

FIG. 2 shows a block diagram of the major components comprising the integrated building services in an embodiment of the present invention. Referring now to FIG. 2, a design pattern is illustrated that shows the types of elements in the system and method of the present invention and their connectivity relationships. The diagram therefore shows a pattern for many possible embodiments of similar types of elements and does not represent a specific embodiment. The present invention provides an inter-networked integrated building facility, device and service interconnection network interface, architecture of integrated office service facilities, and device adapter modules. A building can be retrofitted with this technology or built from the ground up.

Within Building Element 106, External Communications Interface 202 connects Building Element 106 to Public Internet 102 via Communications Channel 108. The various elements within Building 106 are connected to External Communications Interface 202, as well as to each other, via Interconnection Channel 204. Interconnection Channel 204 may be telephone wire, coaxial cable, fiber optic, wireless, Ethernet, or any other suitable communication channel, or combinations of any of the above.

Elements of the invention contained within the office building embody the invention's service process execution machinery. These elements and their relationships are organized in such a way as to allow unprecedented levels of automated office facility integration.

Typical facilities include Client Devices 206, MIS (Management Information System) Application 208, and Service Devices 210. For each Client Device 206, Service Device 210, and MIS Application 208, there is a corresponding Adapter Element 212, which is an interface between the particular object and a standardized system that ties them all together. Adapter Elements 212 are software components that reside on Server 214, and are not physically located adjacent to Client Devices 206, Service Devices 210, and MIS Application 208 but are shown this way in FIG. 2 to illustrate the interconnectedness of each component to the standardized system.

Client Applications 216 are applications written from the outset that automatically tie into the integrated building services system, and may reside within Building Element 106, or be accessible from an external location through Public Internet 102. Such client applications include custom travel arrangement services, meeting and resource scheduling, copy center, computer based training, health monitoring services, member Intranet, view account, and automatic personal adaptable environment controls. Personal climate controlled settings are transferable with the user from one Building Element 106 to another via the access security devices.

For example, a media center application allows a user to copy documents and publish documents remotely. Automated media center services include: remote access, copy services, worldwide distribution, and on-site custom work orders. A user who has a document on his personal computer can access the media center application and provide instructions to print a certain number of copies, request an ink color, request that a copy be sent to a list of specified locations, and specify the database that has the address information for the list of recipients.

Examples of Client Devices 206 are personal computers, personal digital assistants, office telephones, and cellular telephones. The personal computers are connected to Interconnection Channel 204, which may be a LAN or Ethernet. The telephone signals are also integrated into the system so that local telephone calls and long-distance charges are managed by the system. Office suite telephony, shared teleconferencing service, Internet access, and standard Internet services are all integrated into the system. Standard office software functionality, including integrated word processing, presentation development, spreadsheet, database management, file system facilities and automated file backup and restore processes are also integrated into the system.

Examples of Service Devices 210 include vending machines, access security devices, printers, copiers, fax machines, health and exercise equipment, bio-metric monitors, and point of sale devices. For instance, a soft drink vending machine sitting in a hallway within Building Element 106 is plugged into the wall for its power but it also has a card reader instead of a change receiver and dispenser. A phone line connects the card reader of the soft drink machine to Interconnection Channel 204 to Server 214. When a user swipes an authorized magnetic card through the card reader, a signal carrying a unique access ID travels over the phone line to Interconnection Channel 204 to Server 214. The Adapter Element 212 associated with the soft drink machine interprets the access ID from the signal, searches a database of access ID's for a match, and if a match is found, debits the user's account associated with the access ID, and sends an authorization signal to the soft drink machine to allow the release mechanism to release the soft drink from the vending machine. If no match is found, then a deny signal is sent to the soft drink machine to not allow the release mechanism to function. A similar scenario takes place when the magnetic card is swiped through a card reader for a security door. If a match is found for the access ID, an authorization signal is sent to allow the door mechanism to let the door open, though an account may not be debited when a match is found in this case.

Another example of a Service Device 210 is a point of sale device. A magnetic swipe card or smart card or Java ring is utilized by a user or a customer to purchase goods or services, which are debited to the user or customer's account. A hotel or a golf course could issue a card to a customer, and have a card reader at each point of sale location on the premises. For example, each golf cart could be equipped with a reader and a wireless transmitter. To rent the cart the customer just swipes his card through the reader, and his account is debited for the cart rental. Likewise, purchases at a gift shop or restaurant in a hotel could be made with the card and reader. Each purchase is debited to the guest's account.

Examples of MIS Application 208 include integrated enterprise resource planning and management information systems. These systems comprise support for standard business functions such as accounting, general ledger, receivables, payables, asset management, budget, purchasing, billing, payroll, inventory, human resources, economic monitoring, decision support, order management, and inventory, etc. Remote secure access by integrated office support staff is enabled via Public Internet 102 to building automated management facilities. Intelligent Agent scheduling, tracking, confirmation, contacts, etc. is also enabled.

This new organization is possible because of recent advances in the international standardization of software component interfaces and integration technology. An exemplary reference is Sun Microsystems Java programming language incorporating the following: Java Virtual Machine; standard Java application programming interface libraries; Java component specifications such as Enterprise Java Beans and associated component server technology such as Java applets and Java servlets; and impromptu networking interface standards such as Jini and JavaSpaces. The present invention extends these standards and available compliant commercial technologies by defining classes of office services as universal polymorphic interface Adapter Elements 212 to ad hoc machinery and software. Adapter Elements 212 are used to encapsulate arbitrary office support equipment and software services into a uniform distributed device space. Adapted and newly developed services and devices may be plugged into Interconnection Channel 204 and automatically begin participating in the community of office functionality.

The present invention provides a single integrated building containing office support services such as secure building, office suite, and other building resource access. Personal identification for access to secured building resources is accomplished through a combination of mechanisms collocated with the secured resource. These mechanisms consist of either physical or digital identity sensors.

A magnetic stripe card may be utilized. Or, to avoid the wear over time associated with a magnetic stripe card, smart cards or other proximity devices, such as a Java ring, may be used. The smart card and Java ring have some of the computing built into the device and they do not come into direct contact with the device that reads them due to the wireless or infrared technology employed.

In the case of digital identity sensors, the office user requesting access must possess a digital identification device. The sensor mechanisms communicate with the integrated office security service via Interconnection Channel 204 interface using identical protocols. This is accomplished by encapsulating the sensors with a corresponding Adapter Element 212.

Various types of physical identity sensors may be utilized, including hand geometry, retinal scan, and voice signature sensors. Commercially available wearable embedded Java computing technology such as smart cards and Java rings may be used. The wearable technology is extended by the development of software programs that run on the embedded devices, which interact with the digital identity sensors.

All office services may be tailored to user preferences. Tailoring is conveniently accomplished through interaction between the user and software preference wizard agents. Services are encapsulated with standard interconnection behaviors using the Interconnection Channel 204 and Adapter Elements 212, allowing the underlying implementation of any service or device to be changed without affecting the behavior of the whole system. The encapsulation feature also provides for the seamless integration of many additional service facilities.

As shown in FIG. 1, a plurality of Building Elements 106 may be connected together over wide area networks. Office user preferences are continuously maintained in all integrated Building Elements 106.

Many additional services may also be integrated into the system including personalized fitness center programs and automated, voice progress monitoring. Personal health monitoring systems that capture and transmit biological data to control hardware and software may be placed in convenient locations within the building, such as rest rooms, break rooms, and office suites. This data could be securely transmitted by the user to his doctor at the user's discretion.

Other services include adaptive intelligent personal software agents that perform routine system functions for office users. These agents adapt dynamically to the preferences of the office user. Each office user's personalized agents will be available at all integrated Building Elements 106. Categories of agent function include: electronic commerce, knowledge domain expertise, newsgathering, general and specialized web searching, stock market monitoring, and updated material monitoring.

Interactive voice capabilities may also be incorporated into Client Devices 206 and Service Devices 210 via Adapter Elements 212. This approach ensures that the vocal interfaces are consistent across all devices. Personal digital identification devices may also be extended by software programs to directly interact with the office users' personal software agents.

All the different Client Devices 206, Service Devices 210, Client Applications 216, and MIS Application 208 are tied into Server 214 via Interconnection Channel 204. Server 214 is where all of the communication signals are interpreted and processed by Adapter Elements 212. Server 214 also contains standard software service elements, such as databases, software programs, Web service programs, application programs, etc.

Figure 3:
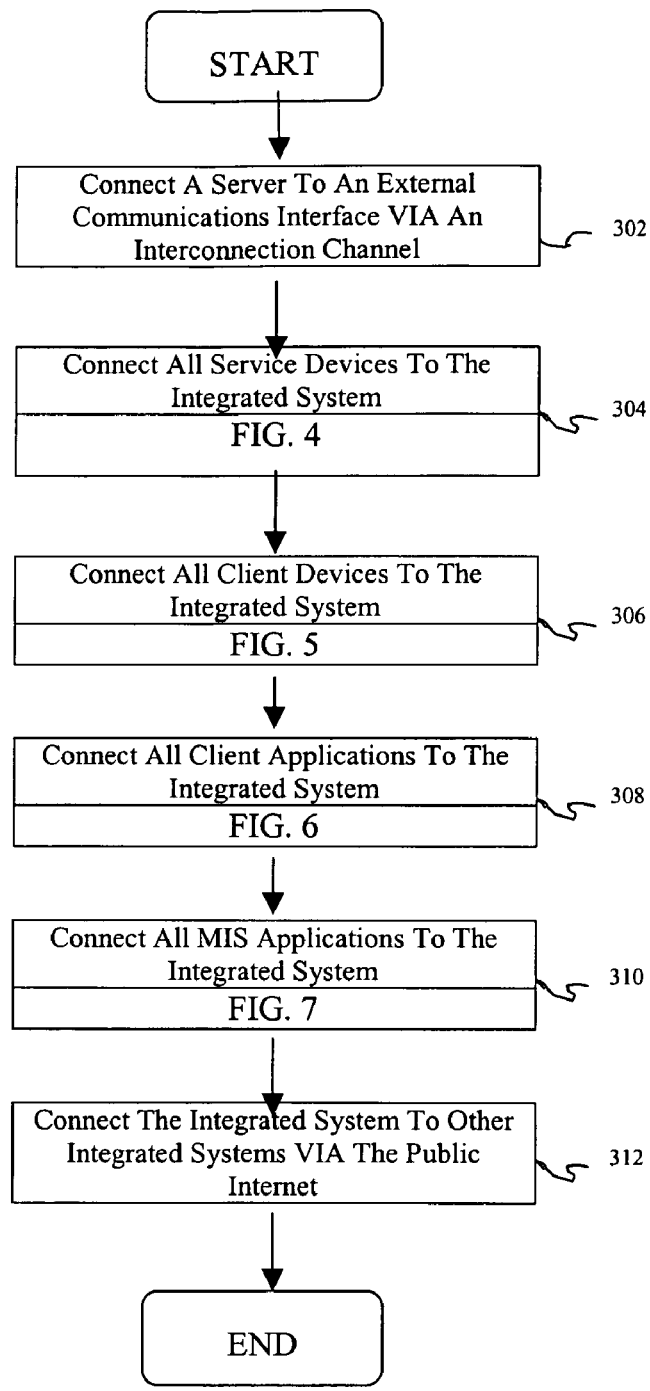
FIG. 3 shows a flow diagram of the overall method of integrated building services of the present invention.

FIG. 3 shows a flow diagram of the overall method of integrated building services of the present invention. Referring now to FIG. 3, after identifying a business entity desiring to integrate building services, such as the embodiment shown in FIG. 2, one or more of the following acts or steps may be performed. In step 302 a Server 214 is connected to External Communications Interface 202 via Interconnection Channel 204 within a Building Element 106 of the business entity. Step 304 calls the process of FIG. 4 where all service devices are connected to the integrated building services system.

Figure 4:
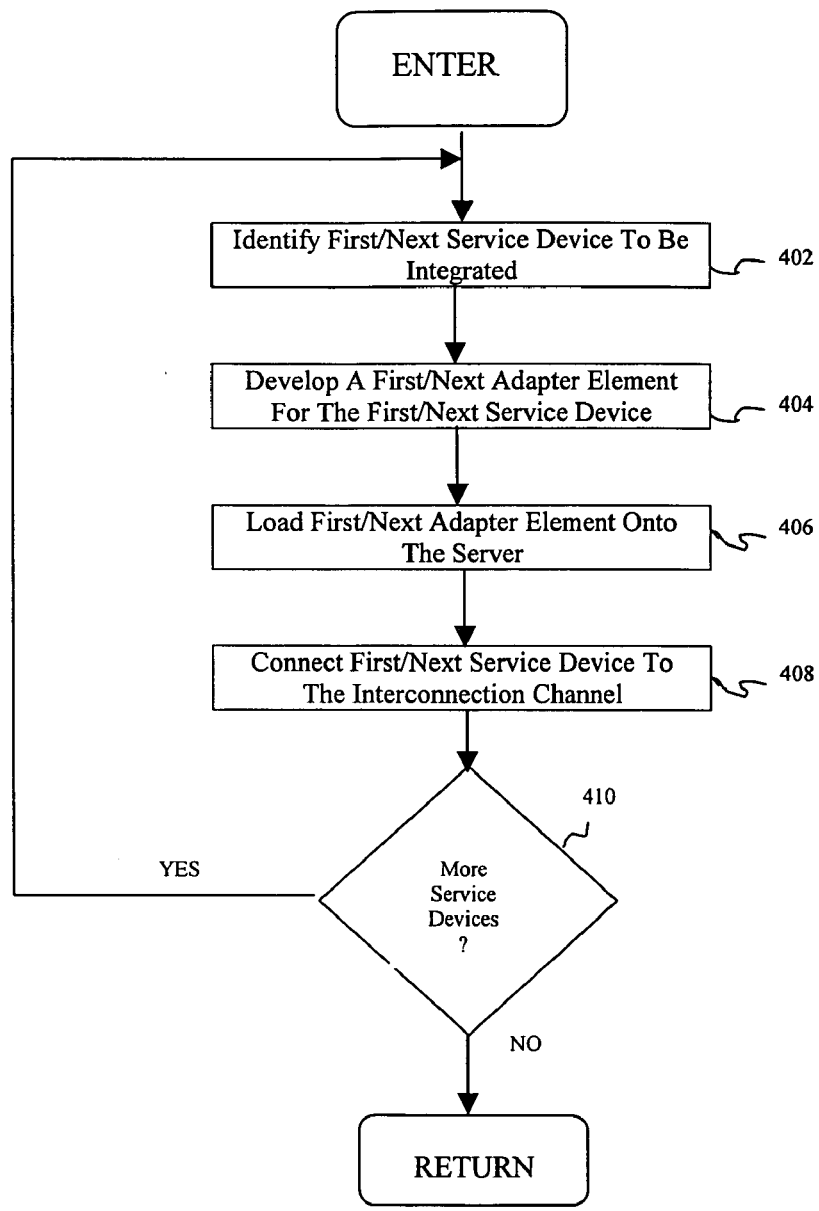
FIG. 4 shows a flow diagram of the process where all service devices are connected to the integrated building services system of the present invention.
Figure 5:
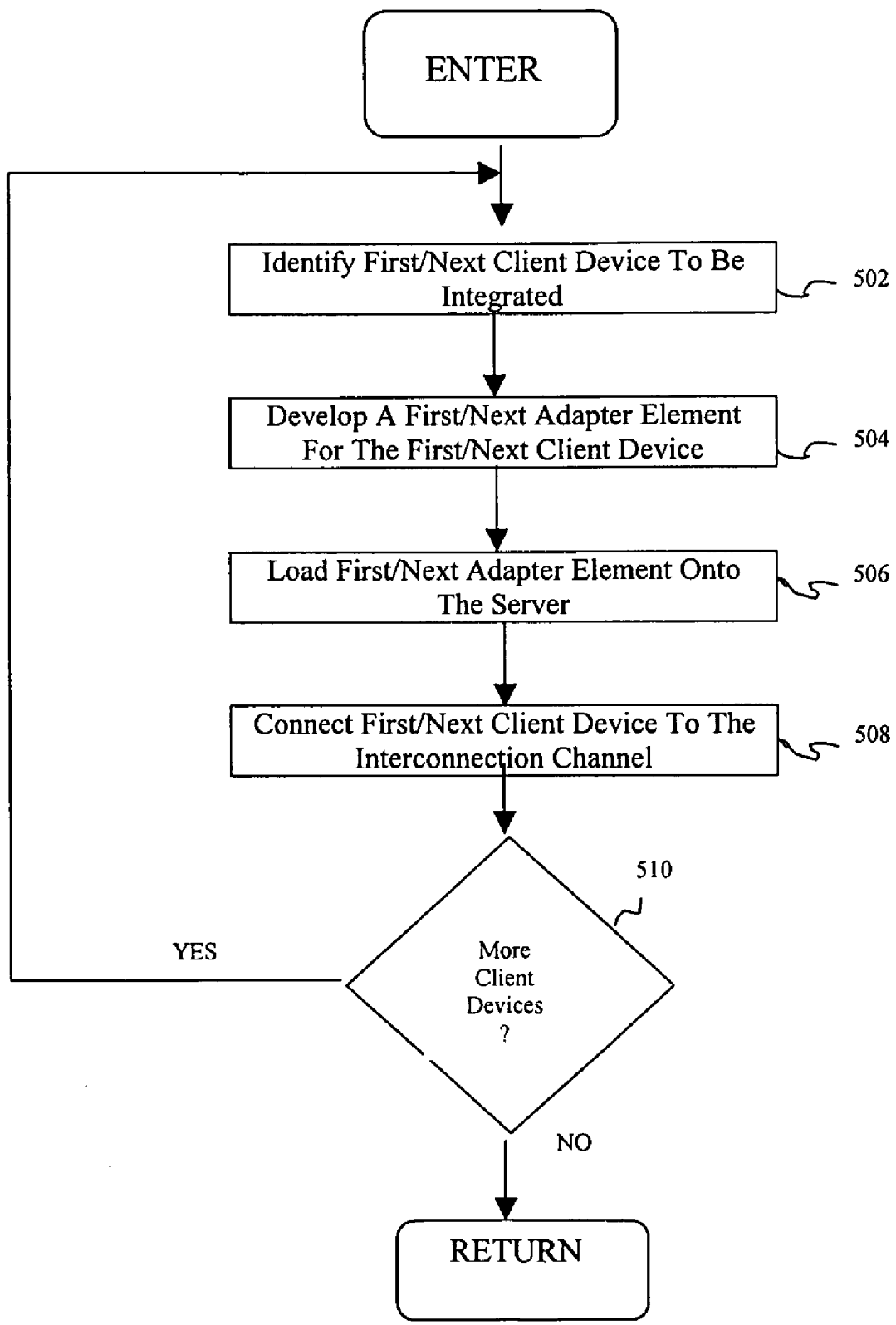
FIG. 5 shows a flow diagram of the process where all client devices are connected to the integrated building services system of the present invention.

After returning from FIG. 4, step 306 calls the process of FIG. 5 where all client devices are connected to the integrated building services system. After returning from FIG. 5, step 308 calls the process of FIG. 6 where all client applications are connected to the integrated building services system. After returning from FIG. 6, step 310 calls the process of FIG. 7 where all MIS applications are connected to the integrated building services system.

In step 312, the integrated business services system is connected to other Building Elements 106 of the business entity via the Public Internet 102 and Communications Channels 108. Then the overall method of integrated building services of the present invention ends.

FIG. 4 shows a flow diagram of the process where all service devices are connected to the integrated building services system of the present invention. Referring now to FIG. 4, one or more of the following acts or steps may be performed. Step 402 identifies a first Service Device 210 associated with the business entity that needs to be integrated. Service Device 210 may be a vending machine, access security device, printer, copier, fax machine, health equipment, a point of sale device, or other similar device. An Adapter Element 212 is then developed for the Service Device 210 in step 404. The Adapter Element 212 is software that serves as an interface between the particular Service Device 210 and the integrated building services system that ties all the disparate components together.

In step 406 the Adapter Element 212 developed for the Service Device 210 is loaded onto Server 214. Service Device 210 is then connected to Interconnection Channel 204 in step 408 through an appropriate means. The connection may be made via telephone wire, coaxial cable, fiber optic, wireless, Ethernet, or any other suitable communication channel. Step 410 determines if there are other Service Devices 210 that need to be integrated into the integrated building services system. If yes, control returns to step 402 for the next Service Device 210 to be integrated. If not, then the process of FIG. 4 ends and returns to calling FIG. 3.

FIG. 5 shows a flow diagram of the process where all client devices are connected to the integrated building services system of the present invention. Referring now to FIG. 5, one or more of the following acts or steps may be performed. Step 502 identifies a first Client Device 206 associated with the business entity that needs to be integrated. Client Device 206 may be a personal computer, office telephone, or other similar device. An Adapter Element 212 is then developed for the Client Device 206 in step 504. The Adapter Element 212 is software that serves as an interface between the particular Client Device 206 and the integrated building services system that ties all the disparate components together.

In step 506 the Adapter Element 212 developed for the Client Device 206 is loaded onto Server 214. Client Device 206 is then connected to Interconnection Channel 204 in step 508 through an appropriate means. The connection may be made via telephone wire, coaxial cable, fiber optic, wireless, Ethernet, or any other suitable communication channel. Step 510 determines if there are other Client Devices 206 that need to be integrated into the integrated building services system. If yes, control returns to step 502 for the next Client Device 206 to be integrated. If not, then the process of FIG. 5 ends and returns to calling FIG. 3.

Figure 6:
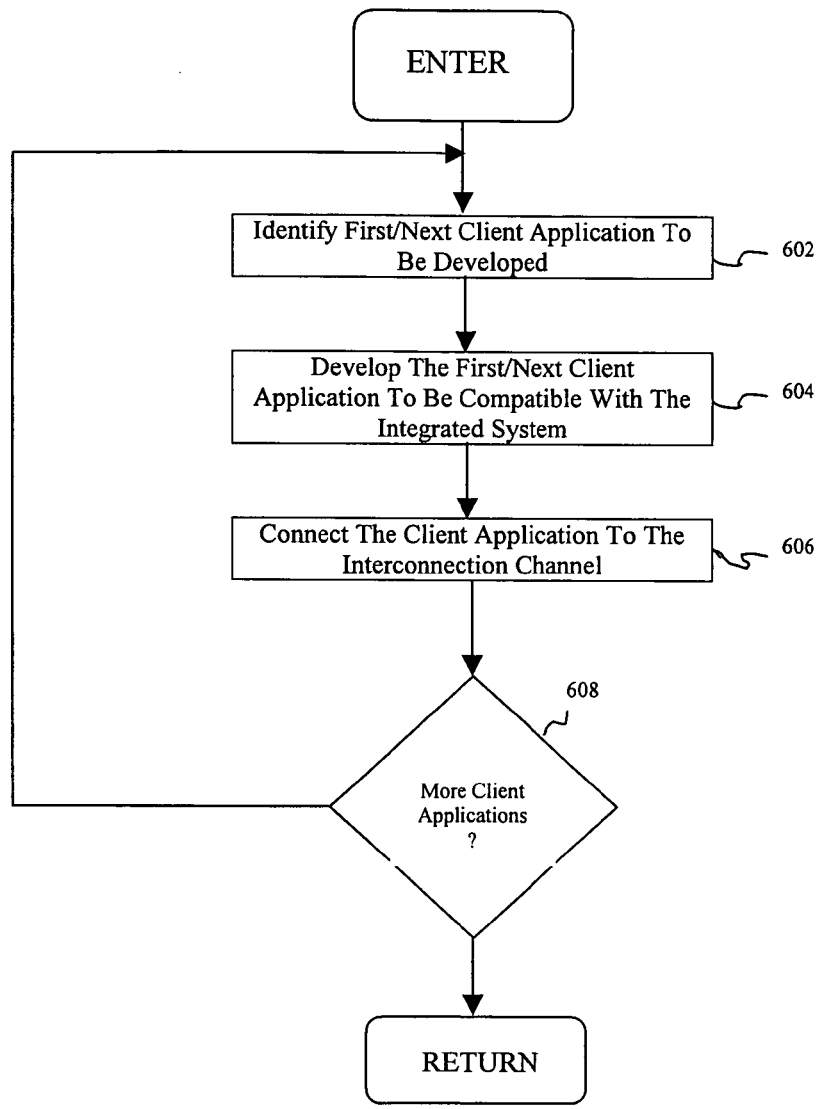
FIG. 6 shows a flow diagram of the process where all client applications are connected to the integrated building services system of the present invention.

FIG. 6 shows a flow diagram of the process where all client applications are connected to the integrated building services system of the present invention. Referring now to FIG. 6, one or more of the following acts or steps may be performed. Step 602 identifies a first Client Application 216 associated with the business entity that needs to be developed. Client Application 216 may be custom travel arrangement services, meeting and resource scheduling, computer based training, health monitoring services, member Intranet, view account, and automatic personal adaptable environment controls.

In step 604 Client Application 216 is developed to be compatible from the outset with the integrated building services system that ties all the disparate components together. Client Application 216 is software that may be loaded onto Server 104, or onto a personal computer. In step 606 the personal computer containing Client Application 216 is connected to Interconnection Channel 204 through an appropriate means. The connection may be made via telephone wire, coaxial cable, fiber optic, wireless, Ethernet, or any other suitable communication channel. Step 608 determines if there are other Client Applications 216 that need to be developed for the integrated building services system. If yes, control returns to step 602 for the next Client Application 216 to be developed. If not, then the process of FIG. 6 ends and returns to calling FIG. 3.

Figure 7:
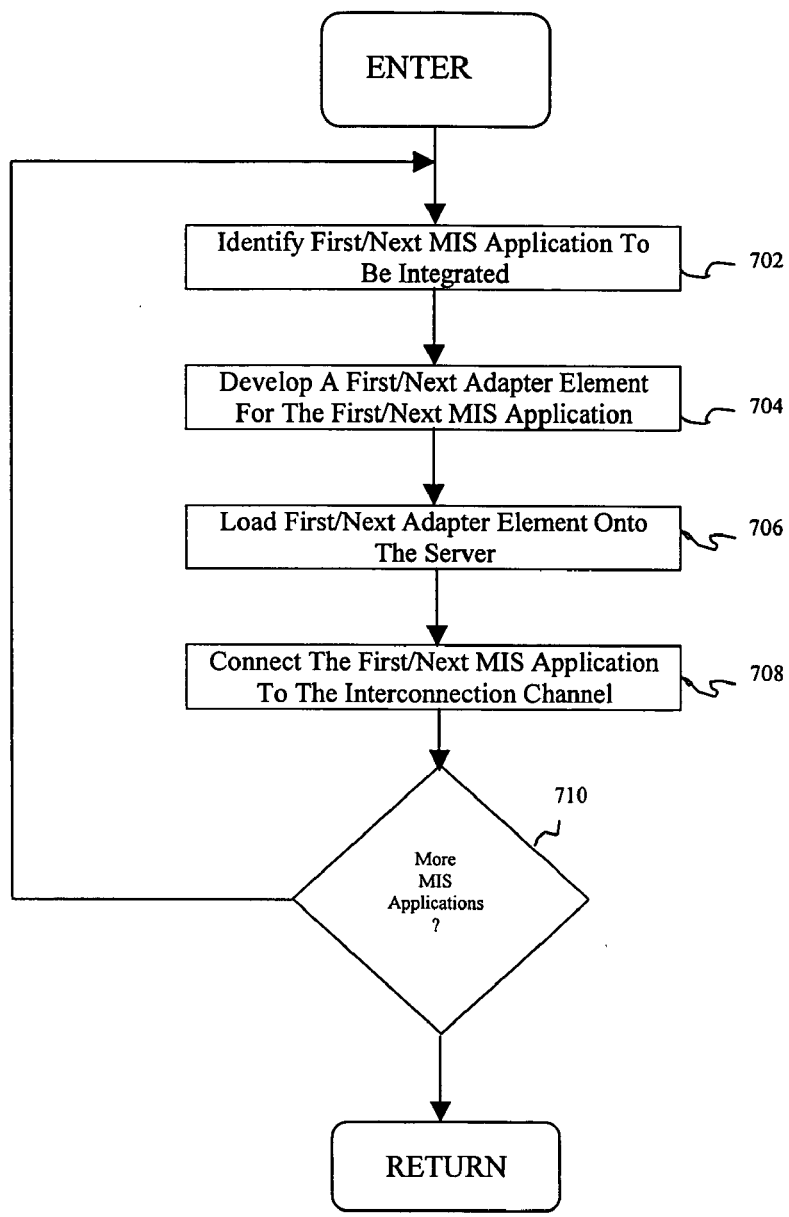
FIG. 7 shows a flow diagram of the process where all MIS applications are connected to the integrated building services system of the present invention.

FIG. 7 shows a flow diagram of the process where all MIS applications are connected to the integrated building services system of the present invention. Referring now to FIG. 7, one or more of the following acts or steps may be performed. Step 702 identifies a first MIS Application 208 associated with the business entity that needs to be integrated. MIS Application 208 may be integrated enterprise resource planning and management information systems for standard business functions such as accounting, general ledger, receivables, payables, asset management, budget, purchasing, billing, payroll, inventory, human resources, economic monitoring, decision support, order management, and inventory, etc. Typically MIS Applications 208 are commercial off the shelf software products. An Adapter Element 212 is then developed for the MIS Application 208 in step 704. The Adapter Element 212 is software that serves as an interface between the particular MIS Application 208 and the integrated building services system that ties all the disparate components together.

In step 706 the Adapter Element 212 developed for the MIS Application 208 is loaded onto Server 214. MIS Application 208 may also be loaded on Server 214 or on a personal computer. MIS Application 208 is then connected to Interconnection Channel 204 in step 708 through an appropriate means. The connection may be made via telephone wire, coaxial cable, fiber optic, wireless, Ethernet, or any other suitable communication channel. Step 710 determines if there are other MIS Applications 208 that need to be integrated into the integrated building services system. If yes, control returns to step 702 for the next MIS Application 208 to be integrated. If not, then the process of FIG. 7 ends and returns to calling FIG. 3.

Figure 8:
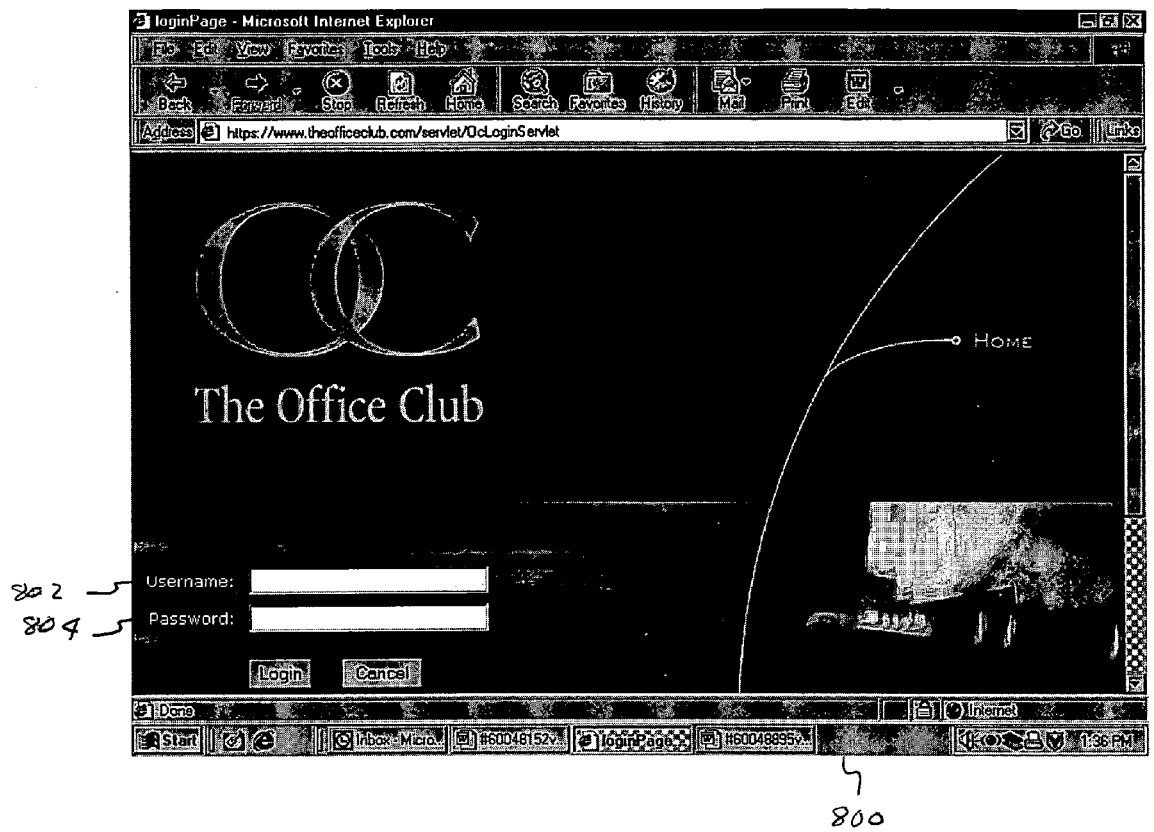
FIGS. 8 and 9 are screen shot representations of Web pages accessible to a user through a Web Browser which demonstrate a simple embodiment of the integrated building services of the present invention, as shown in FIG. 2, from the perspective of a user.
Figure 9:
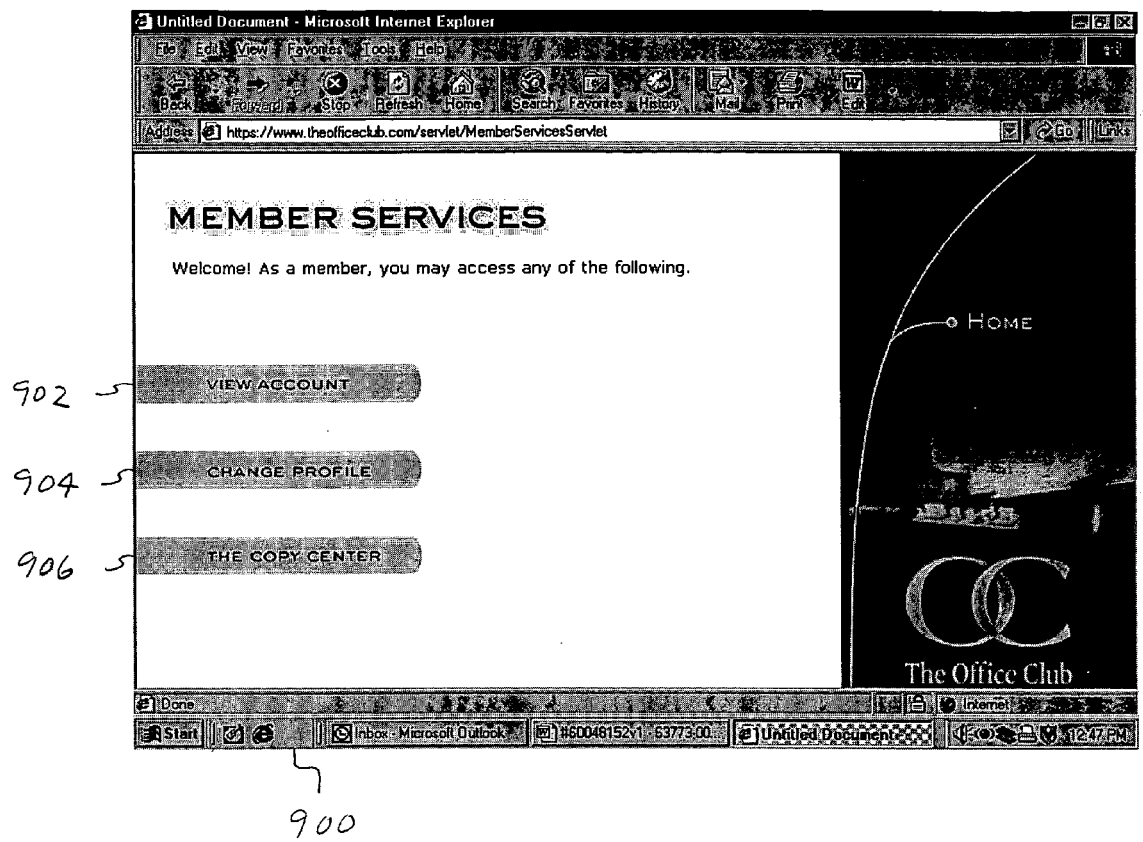

FIGS. 8 and 9 are screen shot representations of Web pages accessible to a user through a Web Browser which demonstrate a simple embodiment of the integrated building services of the present invention, as shown in FIG. 2, from the perspective of a user. In this embodiment, office suites are leased to various tenants where some of the integrated building services shown in FIG. 2 are available to each tenant. One skilled in the art will recognize that there are hundreds of different applications that could utilize the present invention. The office suites embodiment is merely illustrative of these many applications and is not intended to be limiting thereto.

Referring now to FIG. 8, a user has leased an office suite that offers some of the integrated building services of the present invention as shown in FIG. 2. The user is issued an access device, such as a magnetic swipe card, smart card, or Java ring, which gives the user access to many of the integrated building services. For example, the access device enables the user to utilize a variety of Service Devices 210 equipped with access device readers, such as: entering the building through external security doors; gaining access to the user's leased office suite through internal security doors; accessing special purpose rooms in the building, such as meeting rooms, video conference rooms, or a fitness center; purchasing stamps or mailing supplies at an in-house mail center, copying documents at an in-house copy center; purchasing a meal at an in-house restaurant; or purchasing a soft drink or snack from in-house vending machines. Each Service Device 210 has a corresponding Adapter Element 212 loaded on Server 214 which enables each of the different Service Devices 210 to be integrated within the integrated building services system.

From the user's computer, which is a Client Device 206 connected to Interconnection Channel 204, the user can login to the office suite Web site to gain access to other integrated building services. The office suite Web site may be located on server 214 or on an external server.

After requesting the URL of the office suite Web site, Web Page 800 is displayed on the display screen of the user's computer. The user is prompted to enter a username and password in Username Input Box 802 and Password Input Box 804 respectively. If the user's username and password are entered correctly and validated, Web Page 900 of FIG. 9 is displayed.

From Web Page 900 the user can access various Client Applications 216, such as custom travel arrangement services, meeting and resource scheduling, copy center, computer based training, health monitoring services, member Intranet, view account, and automatic personal adaptable environment controls. In this embodiment of the invention, only two Client Applications 216 are accessible by clicking on View Account Select Bar 902 and The Copy Center Select Bar 906.

Clicking on View Account Select Bar 902 returns a new Web page to the user (not shown) which accesses a Client Application 216 called view account. The view account Web page shows information regarding the charges to the user's account. The information may be viewed in different forms, such as itemized month to date, itemized year to date, summary month to date, summary year to date, etc.

Clicking on The Copy Center Select Bar 906 returns a new Web page to the user (not shown) which accesses a Client Application 216 called the copy center. The copy center Web page allows the user to send a document to several people at once. A complicated document order can be easily handled through the prompts and options provided for on the copy center Web page.

Clicking on Change Profile Select Bar 904 returns a new Web page to the user (not shown) which allows the user to change his username and password.

The user's office telephone, which is also a Client Device 206 connected to Interconnection Channel 204, is provided with long distance service. In this embodiment of the invention, there are no MIS Applications 208 accessible by the user.

Having described a presently preferred embodiment of the present invention, it will be understood by those skilled in the art that many changes in construction and circuitry and widely differing embodiments and applications of the invention will suggest themselves without departing from the scope of the present invention, as defined in the claims. The disclosures and the description herein are intended to be illustrative and are not in any sense limiting of the invention, defined in scope by the following claims.

What is claimed is:

1. A method for integrating building services comprising the acts of:
    (a) connecting at least one server to a first external communications interface via a first interconnection channel to form a first integrated building services system;
    (b) connecting a plurality of integrated building services to said first interconnection channel, wherein said first integrated building services system and said plurality of integrated building services form a first building element, and further wherein said plurality of integrated building services are two or more of at least one service device, at least one client device, at least one client application, and at least one MIS application;
    (c) developing an adapter element for each of said at least one service device, each of said at least one client device, and each of said at least one MIS application, wherein each said adapter element is an interface between said first integrated building services system and each of said at least one service device, each of said at least one client device, and each of said at least one MIS application;
    (d) loading each of said adapter elements onto said at least one server, wherein said first interconnection channel and each of said adapter elements encapsulate said plurality of integrated building services with a standard interconnection behaviors, allowing an underlying implementation of any of said plurality of integrated building services to be changed without affecting the behavior of said first integrated building services system;
    (e) for said at least one client application,
        (e1) developing said first client application to be compatible with said first integrated building services system; and
        (e2) connecting said first client application to said first interconnection channel;
    (f) connecting said first external communications interface to a public internet via a first communications channel; and
    (g) accessing a web site associated with said first integrated building services system by a user to gain access by said user to utilize any of said plurality of integrated building services of said first building element.

2. A method for integrating building services according to claim 1 wherein said at least one service device is selected from the group consisting of vending machines, access security devices, printers, copiers, fax machines, health and exercise equipment, bio-metric monitors, and point of sale devices.

3. A method for integrating building services according to claim 1 further comprising the acts of:
    interpreting an access ID from a signal received in a first said adapter element in said at least one server, wherein said signal is received via said first interconnection channel from an access device reader associated with said at least one service device in response to interaction with an access device;
    searching a database within said at least one server for a matching access ID;
    when a match is found, sending an authorization signal to said at least one service device; and
    when a match is not found, sending a deny signal to said at least one service device.

4. A method for integrating building services according to claim 1 wherein said at least one client device is selected from the group consisting of personal computers, personal digital assistants, office telephones, and cellular telephones.

5. A method for integrating building services according to claim 1 wherein said at least one client application is selected from the group consisting of custom travel arrangement services, meeting and resource scheduling, copy center, computer based training, health monitoring services, member Intranet, view account, and automatic personal adaptable environment controls.

6. A method for integrating building services according to claim 1 further comprising the acts of:
    repeating acts (e), (e1), and (e2) for at least one next client application.

7. A method for integrating building services according to claim 1 wherein said at least one MIS application is selected from the group consisting of integrated enterprise resource planning and management information, accounting, general ledger, receivables, payables, asset management, budget, purchasing, billing, payroll, inventory, human resources, economic monitoring, decision support, order management, and inventory.

8. A method for integrating building services according to claim 1 further comprising the acts of:
    (h) connecting another plurality of integrated building services to a second interconnection channel having a second external communications interface to form a second integrated building services system within a second building element; and (i) connecting said first building element to said second building element via a communications network connected between said first external communications interface and said second external communications interface, wherein said first integrated building services system is compatible with said second integrated building services system.

9. A method for integrating building services according to claim 8 wherein said another plurality of integrated building services is selected from the group consisting of service devices, client devices, client applications, and MIS applications.

10. An apparatus for integrated building services, said apparatus comprising:
- a first building element, said first building element comprising;
  - a first integrated building services system, said first integrated building services system comprising;
    - at least one server;
    - a first external communications interface; and
    - a first interconnection channel connecting said at least one server to said first external communications interface;
  - a plurality of integrated building services connected to said first integrated building services system, wherein said plurality of integrated building services are two or more of at least one service device, at least one client device, at least one MIS application, and at least one client application, wherein said at least one client application is developed to be compatible with said first integrated building services system and is connected to said first interconnection channel;
  - an adapter element for each of said at least one service device, each of said at least one client device, and each of said at least one MIS application, wherein each said adapter element is loaded onto said at least one server, and each said adapter element is an interface between said first integrated building services system and each of said at least one service device, each of said at least one client device, and each of said at least one MIS application, and further wherein said first interconnection channel and each of said adapter elements encapsulate said plurality of integrated building services with a standard interconnection behaviors, allowing an underlying implementation of any of said plurality of integrated building services to be changed without affecting the behavior of said first integrated building services system;
  - a first communications channel connecting said first external communications interface to a public internet; and
  - a web site associated with said first integrated building services system which is accessed by a user in order to utilize any of said plurality of integrated building services of said first building element.

11. An apparatus for integrated building services according to claim 10 wherein said at least one service device is selected from the group consisting of vending machines, access security devices, printers, copiers, fax machines, health and exercise equipment, bio-metric monitors, and point of sale devices.

12. An apparatus for integrated building services according to claim 10 further comprising:
- an access device reader associated with said at least one service device;
- an access device operable together with said access device reader, wherein when operable together said access device causes a signal to be sent from said access device reader over said first interconnection channel to a first said adapter element, and further wherein said first said adapter element interprets an access ID from said signal; and
- a database within said server, wherein said first said adapter element searches said database for a matching access ID and when a match is found, said first said adapter element sends an authorization signal to said at least one service device, and when a match is not found said first said adapter element sends a deny signal to said at least one service device.

13. An apparatus for integrated building services according to claim 10 wherein said at least one client device is selected from the group consisting of personal computers, personal digital assistants, office telephones, and cellular telephones.

14. An apparatus for integrated building services according to claim 10 wherein said at least one client application is selected from the group consisting of custom travel arrangement services, meeting and resource scheduling, computer based training, health monitoring services, member Intranet, view account, and automatic personal adaptable environment controls.

15. An apparatus for integrated building services according to claim 10 wherein said at least one MIS application is selected from the group consisting of integrated enterprise resource planning and management information, accounting, general ledger, receivables, payables, asset management, budget, purchasing, billing, payroll, inventory, human resources, economic monitoring, decision support, order management, and inventory.

16. An apparatus for integrated building services according to claim 10 further comprising:
- a second building element, said second building element comprising;
  - a second integrated building services system, said second integrated building services system comprising;
    - a second external communications interface; and
    - a second interconnection channel connected to said second external communications interface; and
  - another plurality of integrated building services connected to said second integrated building services system; and
- a communications network connected between said first external communications interface and said second external communications interface, wherein said first integrated building services system is compatible with said second integrated building services system.

17. An apparatus for integrated building services according to claim 16 wherein said another plurality of integrated building services is selected from the group consisting of service devices, client devices, client applications, and MIS applications.

* * * * *